United States Patent [19]

Selwyn-Smith

[11] Patent Number: 5,626,940
[45] Date of Patent: May 6, 1997

[54] STORAGE SLEEVE AND METHOD OF MANUFACTURING THE SAME

[76] Inventor: Douglas J. Selwyn-Smith, Selwyns, Unit 2, Vastre Industrial Estate, Newtown, Powys SY16 1DZ, Great Britain

[21] Appl. No.: 379,307

[22] Filed: Jan. 27, 1995

[30] Foreign Application Priority Data

Jan. 28, 1994 [GB] United Kingdom ............ 9401606

[51] Int. Cl.$^6$ ........................................... B32B 3/06
[52] U.S. Cl. .................... 428/102; 206/472; 206/473; 428/104; 428/121; 428/122; 428/124; 428/192; 428/194
[58] Field of Search ................. 428/102, 104, 428/121, 122, 124, 192, 194, 515, 516; 206/472, 473; 156/251, 152, 156, 264

[56] References Cited

U.S. PATENT DOCUMENTS 4,886,299 12/1989 Ducorday ............................ 281/31
5,067,184 11/1991 Last ..................................... 4/502

FOREIGN PATENT DOCUMENTS

| 0201410 | 12/1986 | European Pat. Off. . |
| 607072 | 8/1948 | United Kingdom . |
| 641576 | 8/1950 | United Kingdom . |
| 977367 | 12/1964 | United Kingdom . |
| 1150739 | 4/1969 | United Kingdom . |
| 2180738 | 4/1987 | United Kingdom . |

*Primary Examiner*—Nasser Ahmad
*Attorney, Agent, or Firm*—Gary M. Nath; Nath & Associates

[57] ABSTRACT

A storage sleeve comprising a reinforcing panel and a flexible sheet, wherein the sheet and panel are joined by welding and subsequent sewing, to form a pocket.

3 Claims, 1 Drawing Sheet

STORAGE SLEEVE AND METHOD OF MANUFACTURING THE SAME

BACKGROUND OF THE INVENTION

This invention relates to a storage sleeve and a method of manufacturing the same. In particular, the invention relates to a storage sleeve, of the type used to store posters and art work prints, for point of sale display purposes.

Conventional such sleeves include a rectangular pocket or pouch, formed from a sheet of clear PVC film, folded over itself, with two of its overlying edges sewen together, leaving the edges opposite the fold line unattached, to provide a mouth for the pocket. A corrugated cardboard or polypropylene panel is slidably located inside the pocket, to provide it with rigidity, and the posters or prints, for display, can be slipped into the pocket, between the PVC film and the cardboard or polypropylene panel, so that their printed sides are viewable through the PVC film. Unfortunately, however, such conventional sleeves tend to disintegrate around the opening or mouth, particularly along the sewen seams on either side of the mouth, and at their corners. This problem is exacerbated by movement of the reinforcing panel in the pocket, which can leave the pockets' vulnerable sewen edges largely unprotected from scuff damage.

An apparently obvious solution to these problems would be to extend the reinforcing panel right up to the edges and corners of the pocket and to fix the reinforcing panel to the pocket, around its periphery. However, it has not so far proven possible to sew a pocket together, in this way, because relative movement of the two layers of flexible PVC film and the rigid panel cannot be controlled, during the sewing process; when sewing is attempted, the PVC film tends to buckle up and the buckled portions then become trapped in the sewen seams.

SUMMARY OF THE INVENTION

It is an object of the present invention to overcome at least one of the aforementioned problems, associated with conventional storage sleeves.

In accordance with a first aspect of the present invention, there is provided a storage sleeve comprising a reinforcing panel and a flexible sheet, wherein the sheet and panel are joined by welding and subsequent sewing, to form a pouch or pocket.

Welding the flexible sheet or sheets to the reinforcing panel, prior to sewing the two together, prevents their relative movement during the sewing process and, therefore, allows the sleeve to be formed with a fixed reinforcing panel, which extends right up to the corners and edges thereof. Such a sleeve is far less vulnerable to damage than a conventional sleeve with a moveable reinforcing panel.

In an embodiment of the first aspect of the invention, a second flexible sheet is joined to the reinforcing panel by welding and sewing, to form a second pouch or pocket. Preferably, the flexible sheets sandwiches the reinforcing panel and, in a further embodiment, the reinforcing panel is substantially rectangular and the sheet or sheets are welded thereto adjacent to at least one straight edge thereof. Preferably, the sheet or sheets are welded to the reinforcing panel adjacent to at least two and, preferably, three straight edges thereof.

In a preferred embodiment of the first aspect of the invention, each weld is formed along a major portion of each straight edge of the reinforcing panel and, preferably, the weld is in the form of a continuous welded seam.

The sheets of flexible material can and, preferably, do comprise a single such sheet, folded over the reinforcing panel.

In a preferred embodiment of the first aspect of the invention, the sheet or sheets are sewen to the reinforcing panel along at least one of its straight edges. Preferably the sheet or sheets are sewen to the panel along at least two and, more preferably, three of its straight edges. The sewen seams, preferably, extend substantially into at least one and preferably all of the corners of the panel.

Each sewen seam, preferably, extends along a major portion of the panel edge, where it is located. In preferred embodiments, a ribbon of protective material is folded over at least one welded seam and sewen over the joined sheet or sheets and the panel. Preferably the reinforcing ribbon is held in place by the same stitches employed to join the panel and sheet or sheets.

Preferably, the flexible sheet or sheets is or are scalloped along the edge or edges thereof, which define, with the reinforcing panel, a mouth or opening for the pocket.

It has hitherto proven impossible to weld PVC, particularly to cardboard or polypropylene. Thus, the sheet or sheets should be formed from a flexible material which is weldable to the reinforcing panel. Preferably the sheet or sheets comprise a film of polypropylene, while the preferred material for the reinforcing panel is corrugated polypropylene.

In a most preferred embodiment the sheet or sheets are clear, to allow the contents of the pocket to be viewed therethrough.

In a second aspect, the invention provides a method of manufacturing an article, such as a storage sleeve in accordance with the first aspect of the invention, comprising welding at least one flexible sheet or film to a reinforcing panel and subsequently sewing the same together.

Preferably, a second flexible sheet is joined to the reinforcing panel by welding and sewing.

In a further aspect, the invention provides a method of joining a plurality of sheets or panels, formed from a weldable material, comprising assembling the sheets or panels in place by welding and subsequently sewing the assembly of sheets or panels together. Preferably, at least one of said sheets or panels is substantially rigid and at least one and, preferably, at least two of the sheets or panels are flexible.

BRIEF DESCRIPTION OF THE DRAWINGS

A specific embodiment of the invention will now be described by way of example only and with reference to the accompanying drawings.

DETAILED DESCRIPTION OF PREFERRED EMBODIMENT

Figure 1:
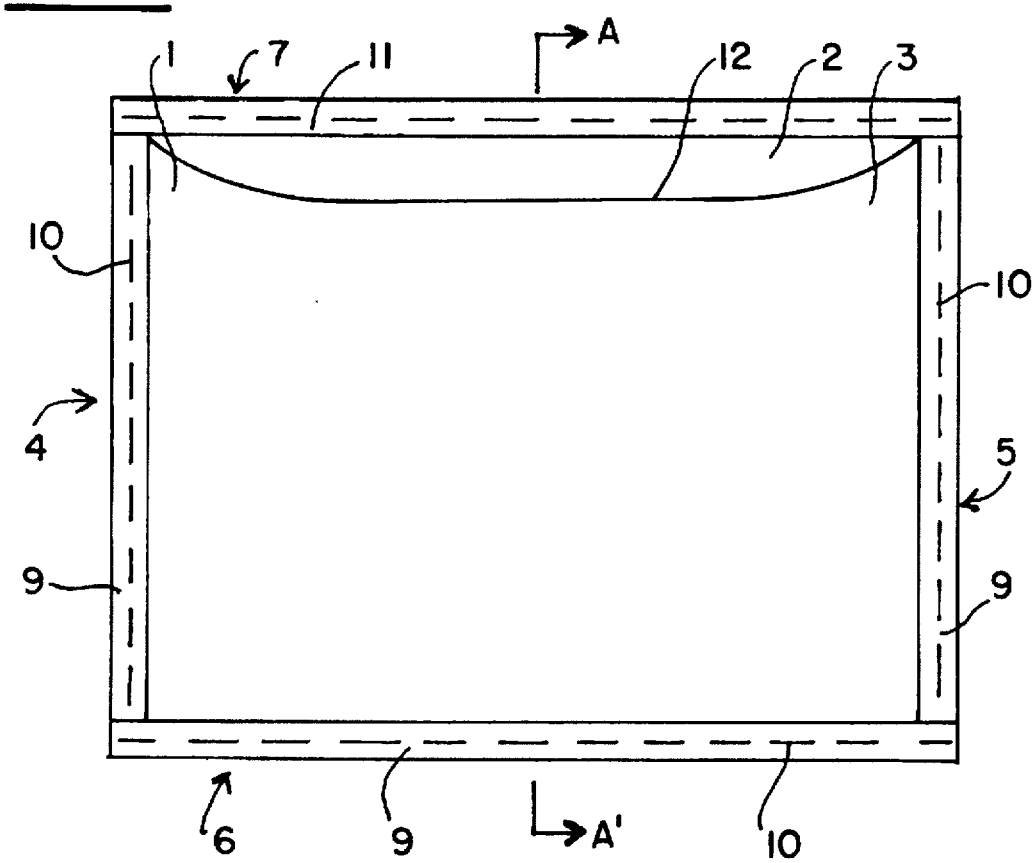
FIG. 1 is a plan view of a storage sleeve in accordance with the present invention.
Figure 2:
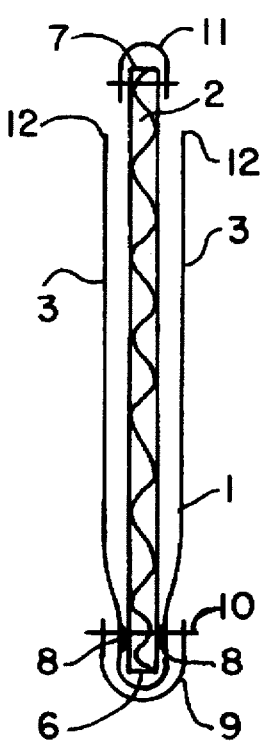
FIG. 2 is a section on A-A' in FIG. 1.

The illustrated storage sleeve comprises a sheet of clear polypropylene film 1 folded over a longer edge 6 of a rectangular corrugated polypropylene panel 2, such that the panel 2 is sandwiched between two substantially rectangular portions 3 of the sheet 1. The sheet portions 3 are joined to the corrugated panel 2, along its two opposed shorter edges 4 and 5 and the one 6 of its longer edges 6 and 7 located in the fold in the polypropylene sheet 1, by welded seams 8 located adjacent to the panel edges 4, 5 and 6. Three lengths of a flexible, fabric reinforced polyurethane ribbon 9 are folded over the welded portions of the polypropylene sheet 1 and the panel 2, and sewen seams 10, comprised of stitching extending right through the ribbons 9, panel 2 and both rectangular sheet portions 3, extend along and substantially parallel to the panel edges 4, 5 and 6. A fourth length of reinforced polyurethane ribbon 11 is similarly attached along the remaining longer edge 7 of the panel 2.

The unattached edges 12, of the flexible sheet 1 are scalloped, such that their central portions are displaced away from the unwelded longer edge 7 of the reinforcing panel 2. The purpose of this scalloping is to reduce the possibility of the flexible sheet portions 3 being torn away from the rigid panel 2 and in order to provide for easier access for the insertion of posters, or art work prints, between the flexible sheets 3 and the rigid panel 2.

In an alternative embodiment, the sheet of clear polypropylene film is folded over a shorter edge of the rectangular corrugated polypropylene panel and the resulting storage sleeve is made with scalloped openings along the opposite shorter edge.

I claim:

1. A storage sleeve comprising a substantially rigid reinforcing panel and a single flexible sheet, said sheet being folded over said panel so as to sandwich said panel therebetween, wherein said sheet and said panel are joined by welding and subsequent sewing to form a pocket on either side of said panel.

2. A storage sleeve comprising:

a substantially rigid reinforcing panel and a flexible sheet, said sheet being joined to said panel by welding and by subsequent sewing, to form a pocket, wherein said sheet is welded to said panel along a major portion of at least one edge thereof and a ribbon of protective material is folded over at least over one welded seam and sewn over said joined sheet and said panel.

3. A storage sleeve, as claimed in claim 2, wherein the reinforcing ribbon is sewen by the same stitches employed to join the panel and sheet.

* * * * *

UNITED STATES PATENT AND TRADEMARK OFFICE
CERTIFICATE OF CORRECTION

PATENT NO.  : 5,626,940
DATED       : May 6, 1997
INVENTOR(S) : Douglas J. Selwyn-Smith It is certified that error appears in the above-identified patent and that said Letters Patent is hereby corrected as shown below:

Column 4, line 19  (Claim 3)

change "sewen" to  -- sewn --

Signed and Sealed this

First Day of July, 1997

Attest:

BRUCE LEHMAN

*Attesting Officer*

*Commissioner of Patents and Trademarks*